Dec. 5, 1967  F. W. BALSTER  3,355,887
TANDEM MASTER CYLINDER
Filed April 4, 1966
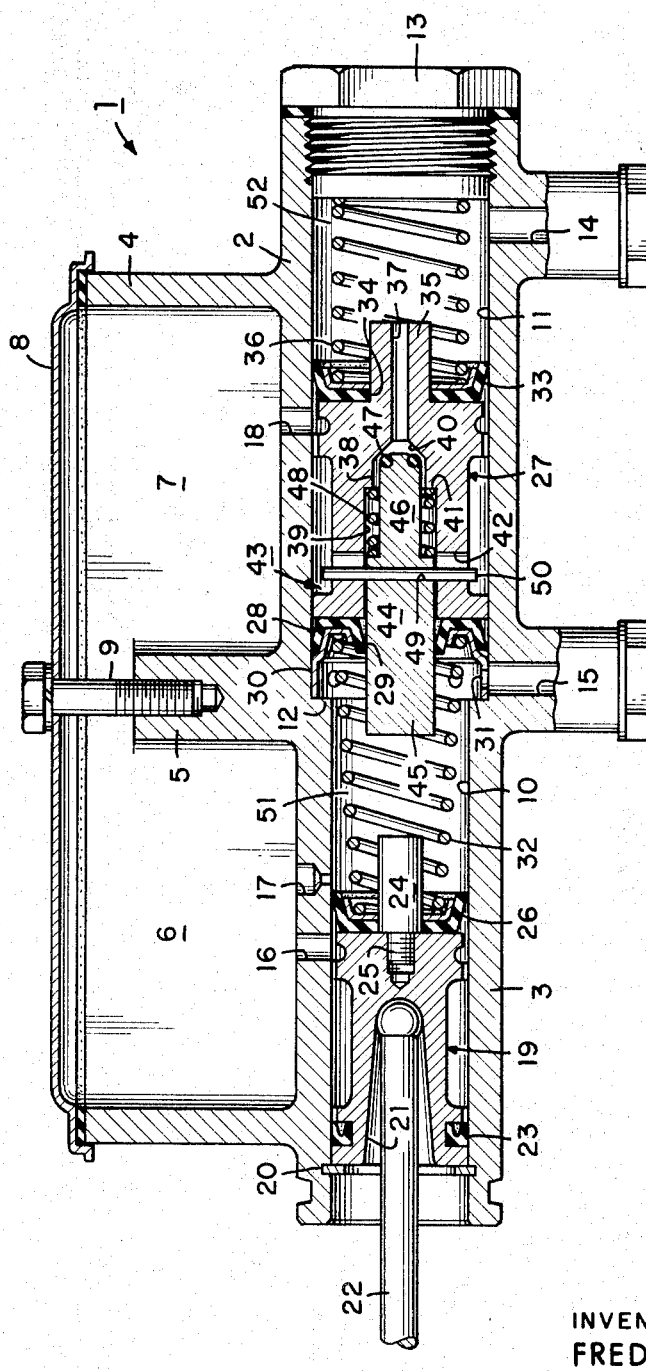
INVENTOR
FREDERICK W. BALSTER
BY
*Joseph E. Papin*

United States Patent Office 3,355,887
Patented Dec. 5, 1967

3,355,887
TANDEM MASTER CYLINDER
Frederick W. Balster, Cedar Rapids, Iowa, assignor, by mesne assignments, to Tung-Sol Electric Inc., Newark, N.J., a corporation of Delaware
Filed Apr. 4, 1966, Ser. No. 540,061
8 Claims. (Cl. 60—54.6)

The present invention relates to fluid pressure systems and more particularly to a tandem master cylinder for use in a dual fluid pressure system.

The principal object of the present invention is to provide a tandem master cylinder with a novel arrangement of the compensating valving in the slave or floating piston which avoids cup damage in the closing of the compensating port associated with said floating piston.

Another object of the present invention is to provide a tandem master cylinder having a pair of axially aligned pistons therein which define a pair of fluid pressure chambers, one of said pistons being movable in response to an applied force to establish fluid pressure in one of said chambers, and means for closing the compensating port to the other of said fluid pressure chamber being movable in the other of said pistons in response to the established fluid pressure in said one chamber.

Another object of the present invention is to provide a tandem master cylinder having a pair of axially aligned pistons therein which define a pair of fluid pressure chambers, reservoir means normally connected with said chambers, respectively, one of said piston means being movable in response to an applied force to interrupt pressure fluid communication between said reservoir means and one of said chambers and establish fluid pressure in one of said chambers, means in the other of said piston means normally movable in response to the established fluid pressure in said one chamber to interrupt pressure fluid communication between said reservoir and the other of said chambers, and a lost-motion connection defined between said last named means and said one piston means for said one piston means to mechanically move said last named means toward its position interrupting pressure fluid communication between said reservoir and said other chamber in the event of fluid pressure failure in said one chamber.

Another object of the present invention is to provide tandem master cylinder having a pair of axially aligned pistons therein defining a pair of fluid pressure chambers, a passage in one of said pistons for the pressure fluid compensation of one of said fluid pressure chambers, and means movable in said one piston to close said passage and thereafter move with said one piston to establish fluid pressure in said one chamber, said means and said one piston being movable in response to fluid pressure established in the other fluid pressure chamber by an applied force movement of the other piston, and in the event of failure to establish fluid pressure in said other chamber, said means and said one piston are mechanically movable by said other piston.

Still another object of the present invention is to provide a tandem master cylinder having a pair of pistons therein defining a pair of fluid pressure chambers, one of said pistons being movable in response to an applied force to close the compensation passage to one of said chambers and establish fluid pressure in said one chamber, and means in the other of said pistons movable relative thereto to close the compensation passage to the other of said chambers and thereafter move concertedly with said other chambers to establish fluid pressure in said other chamber in response to and substantially simultaneously with the establishment of fluid pressure in said one chamber, and a lost-motion connection between said one piston and said means for said one piston to mechanically drive said means and said other piston to establish fluid pressure in said other chamber in the event the applied force movement of said one piston fails to establish fluid pressure in said one chamber.

An still another object of the present invention is to provide a tandem master cylinder of simplified construction and economy of manufacture.

Briefly, the present invention comprises a tandem master cylinder having a pair of fluid pressure generating means therein and defining a pair of fluid pressure chambers, a reservoir in said master cylinder and normally connected in pressure fluid communication with said chambers, and means in one of said fluid pressure generating means controlling pressure fluid communication between said reservoir and one of said chambers, the other of said fluid pressure generating means being movable in response to an applied force to interrupt pressure fluid communication between said reservoir and the other of said chambers and establish fluid pressure therein, said last named means being movable in response to the established fluid pressure in said other chamber toward a position interrupting pressure fluid communication between said reservoir and said one chamber, said last named means and said one fluid pressure generating means being thereafter movable in response to the established fluid pressure in said other chamber to establish another fluid pressure in said one chamber.

These and other objects and advantageous features will become apparent hereinafter by referring to the appended specification and the accompanying drawing which is a cross-sectional view of a tandem master cylinder embodying the present invention.

A tandem master cylinder or fluid pressure generating means 1 is provided with a housing 2 having integrally formed cylinder and reservoir portions 3, 4 therein. A transversely extending wall 5 is integrally provided on the housing 2 dividing the reservoir portion 4 into separate pressure fluid reservoir or sump chambers 6, 7, and a closure assembly 8 is secured in place on said reservoir portion by a bolt 9 which is threadedly received in the wall 5 to prevent the entry of foreign particles into said sump chambers.

The cylinder portion 3 is provided with an axially aligned bore and counterbore 10, 11 therethrough, defining an annular shoulder or abutment 12 at the juncture thereof, and the counter bore 11 is closed on its rightward end by a plug member 13 threadedly received therein. An outlet port 14 is provided in the housing 2 connecting with the counterbore 11 adjacent the rightward end thereof, and another outlet port 15 provided in said housing connects with said counterbore adjacent to the annular shoulder 12. Axially spaced supply and compensation ports 16, 17 are provided in the housing 2 connected between the sump chamber 6 and the housing bore 10 adjacent to the mid-portion thereof, and a supply passage 18 is also provided in said housing connected between the sump chamber 7 and the housing counterbore 11 adjacent to the mid-portion thereof.

A fluid pressure generating piston means 19 is slidably received in the housing bore 10 and retained against displacement therefrom by a snap ring and groove assembly 20 provided adjacent to the leftward end of said housing bore, and an axially extending recess 21 is provided in the leftward end of said piston to pivotally receive the driving end of an operator controlled push rod 22. A secondary piston seal 23 is carried on the piston 19 adjacent the leftward end thereof closing the counterbore 10, and an extension or abutment portion 24 is threadedly connected to the rightward end of said piston at 25 and extends coaxially into the bore 19. A primary seal 26 is fixedly interposed or carried between the piston and extension 19, 24 and is normally in sealing engagement between the housing bore 10 and the piston 19.

Another fluid pressure generating piston means 27 is slidably received in the counterbore 11, and a sealing cup 28 having a centrally located aperture 29 therein is provided in engagement with the leftward end of said piston and is normally in sealing engagement with said counterbore and said piston. A spring retaining member 30 having a plurality of holes 31 therein for pressure fluid flow therethrough is provided in the counterbore 11 and is urged into engagement with the sealing cup 28 by a return spring 32 which is biased between the primary seal 26 and said spring retainer. Another sealing cup 33 having an aperture 34 therein is provided in the counterbore 11 normally in sealing engagement between the counterbore 11 and the rightward end of the piston 27, and an extension 35 on the rightward end of said piston extends through said aperture and is sealably engaged by said sealing cup. A return spring 36 is biased between the plug member 13 and the sealing cup 33 normally urging said sealing cup into engagement with the rightward end of the piston 27 and normally urging the spring retaining member 30 into engagement with the shoulder 12 which serves to limit the leftward movement of the piston 27. Axially aligned stepped bores 37, 38 are provided in the piston 27 with the smaller stepped bore 37 extending through the rightward end of the extension 35 and the leftward end of the larger stepped bore 38 connects with a counterbore 39 which extends through the leftward end of said piston substantially coaxially with the aperture 29 in the sealing cup 28. An annular shoulder or valve seat 40 is defined at the juncture of the stepped bores 37, 38, and another annular shoulder 41 is defined at the juncture of the counterbore 39 and the larger stepped bore 38. A cross-passage 42 is provided in the piston 27 connected between the periphery of said piston intermediate the sealing cups 28, 33 and the counterbore 39 adjacent to the mid-portion thereof.

A valve closure or piston member 43 including a body portion 44 is slidably received in the counterbore 39, and the leftward end 45 of said body portion extends through the aperture 29 of the sealing cup 28 into the bore 10 and the periphery of said leftward end is in sliding sealing engagement with said sealing cup. An extension portion 46 connected to the rightward end of the body portion 44 extends into the larger stepped bore 38 and an O ring or valve element 47 is provided on the rightward end of said extension portion for sealing engagement with the valve seat 40, and a return spring 48 biased between the shoulder 41 and the rightward end of the body portion 44 urges said valve element to a position spaced from said valve seat. A bore 49 is provided through the body portion 44 adjacent to the rightward end thereof, and a spring pin 50 is received in said bore and extends into the cross-passage 42, said spring pin being engageable with the walls of said cross-passage to limit the movement of the valve closure member 43 relative to the piston 27. It should be noticed that a fluid pressure generating chamber 51 is defined in the housing bore and counterbore 10, 11 between the primary seal 26 on the piston 19 and the sealing cup 28 on the piston 27 in open pressure fluid communication with the outlet port 15 and normally connected with the sump chamber 6 through the compensating port 17 and that another fluid pressure generating chamber 52 is defined in the housing counterbore 11 between the sealing cup 33 on the piston 27 and the plug member 13 in open pressure fluid communication with the outlet port 14 and normally connected with the sump chamber 7 through a passage defined by the supply passage 18, the chamber formed by the counterbore 11 and periphery of the piston 27 between the sealing cups 28, 33, the cross-passage 42, and the counterbore 39 and stepped bores 38, 37 in the piston 27. To complete the description of the tandem master cylinder 1, it should also be noticed that the primary seal 26 and the compensating port 17 define a valve controlling pressure fluid communication between the sump chamber 6 and the fluid pressure generating chamber 51, and that the valve element 47 on the valve closure member 43 and the valve seat 40 at the juncture of the stepped bores 37, 38 define another valve controlling pressure fluid communication between the sump chamber 7 and the fluid pressure generating chamber 52.

In the normal operation of the tandem master cylinder 1 with the component parts in their original positions, as shown in the drawing and as hereinbefore described, a manually applied force to the push rod 22 urges the piston 19 rightwardly serving to move the primary seal 26 past the compensating port 17 to close said compensating port or interrupt pressure fluid communication between the sump chamber 6 and the fluid pressure generating chamber 51 and establish fluid pressure in the chamber 51 which is displaced through the outlet port 15 to one of the branches of the dual fluid pressure system (not shown). The established fluid pressure in the chamber 51 is also effective on the leftward end 45 of the valve closure member 43 and the leftward end of the piston 27. The relative valves of the return springs 36 and 48 are so selected that the established fluid pressure in the chamber 51 urges the valve closure member 43 rightwardly relative to the piston 27 and sealably engages the valve element 47 with the valve seat 40 to close the bore 37 to pressure fluid flow and interrupt pressure fluid communication between the sump chamber 7 and the fluid pressure generating chamber 52 substantially simultaneously with the closing of the compensating port 17. Thereafter, the established fluid pressure in the chamber 51 acts on the leftward ends of the piston 27 and valve closure member 43 to concertedly move them rightwardly to establish fluid pressure in the chamber 52 which is displaced through the outlet port 14 to the other branch of the dual fluid pressure system (not shown), substantially simultaneously with the discharge of fluid pressure through the outlet port 15. Since the opposed ends of the piston 27 exposed to fluid pressure in the chambers 51, 52 are equal, the fluid pressures established in said chambers will be substantially equal, and because the fluid pressure responsive area on the leftward end of the valve closure member 43 exposed to fluid pressure in the chamber 51 is greater than the fluid pressure responsive area on the rightward end of said valve closure member exposed to fluid pressure in the chamber 52, said valve closure member will be held in its rightward position interrupting pressure fluid communication between the sump chamber 7 and the fluid pressure generating chamber 52.

When the desired braking effect is obtained, the manually applied force is removed from the push rod 22, and the displaced pressure fluid is returned to the chambers 51, 52 and the pistons 19 and 27 are returned to their original positions by the return springs 32, 36, respectively. Also, the return spring 48 moves the valve closure member 43 leftwardly toward its original position engaging the spring pin 50 with the walls of the cross-passage 42 to prevent displacement of said valve closure member from the piston 27. As the manually applied force is removed, a partial vacuum may be momentarily created in the chambers 51, 52, and the pressure fluid from the sump chambers 6, 7 flows through the supply ports 16 and 18 to the bore 10 between the seals 23 and 26 on the piston 19, and to the counterbore 11 between the sealing cups 28 and 33 on the piston 27, respectively, and therefrom past the collapsed lips of the seal 26 and cup 33 due to the partial vacuum to accomplish pressure fluid compensation in the chambers 51, 52.

It should be understood that the brakes connected with one branch of the dual fluid pressure system will remain operative and will be effective to establish a safe braking of the vehicle if the other branch of the fluid pressure system fails, and the operator will be aware of the defective branch due to the increased pedal stroke necessary to effect the braking application.

In the event of a leak in the fluid pressure branch connected with the outlet port 14, the applied force on the push rod 22 moves the piston 19 rightwardly to close the compensating port 17 and establish fluid pressure in the chamber 51 which is displaced through the outlet port 15, as hereinbefore described. The established fluid pressure in the chamber 51 acts on the leftward end 45 of valve closure member 43 to urge it rightwardly and engage the valve element 47 with the valve seat 40 to prevent relative rightward movement of said valve closure member to the piston 27 and the established fluid pressure also acts on the leftward end of the piston 27 to urge it rightwardly. Since there is no fluid pressure established in the chamber 52 to oppose this rightward movement of the piston 27 and valve closure member 43, they move rightwardly until the extension 35 on the rightward end of said piston abuttingly engages the plug member 13 to limit further rightward movement of said piston and said valve closure member. The leftward ends of the piston 27 and valve closure member 43 thereby serve as a fixed rightward end of the chamber 51 and the sealing cup 28 prevents pressure fluid flow from the chamber 51 into the chamber 52. Thereafter, the applied force to the push rod 22 will continue to establish fluid pressure in the chamber 51 which is displaced through the outlet port 15 to the branch of the dual fluid pressure system connected therewith to effect a safe braking of the vehicle.

In the event of a leak in the fluid pressure branch connected with the outlet port 15, the applied force on the push rod 22 moves the piston 19 rightwardly to close the compensating port 17, but fails to establish fluid pressure in the chamber 51. Further force on the push rod 22 moves the piston 19 rightwardly to engage the extension 24 with the leftward end 45 of the valve closure member 43 and mechanically drives said valve closure member rightwardly to sealably engage the valve element 47 with the valve seat 40 to close the bore 37 to pressure fluid flow and interrupt pressure fluid communication between the sump chamber 7 and the fluid pressure generating chamber 52. Thereafter, the applied force movement of the piston 19 serves to mechanically drive the valve closure member 43 and the piston 27 rightwardly to establish fluid pressure in the chamber 52 which is displaced through the outlet port 14 to the branch of the dual fluid pressure system connected therewith to effect a safe braking of the vehicle.

From the foregoing, it is now apparent that a novel tandem master cylinder meeting the objects set out hereinbefore is provided and that changes or modifications as to the precise configurations, shapes and details of the construction set forth in the disclosure by way of illustration may be made by those skilled in the art without departing from the spirit of the invention, as defined by the claims which follow.

The embodiments of the invention in which an exclusive property or privilege is claimed are defined as follows:

1. A tandem master cylinder comprising a housing having a pair of aligned piston means movable therein, a fluid pressure generating chamber defined in said housing between said piston means, reservoir means in said housing, passage means in said housing normally connecting said chamber in pressure fluid communication with said reservoir means, one of said piston means defining with said housing another fluid pressure generating chamber, the other of said piston means being movable in response to an applied force toward a position in said housing interrupting pressure fluid communication through said passage means between said first named chamber and reservoir means and establishing fluid pressure in said first named chamber, opposed ends on said one piston means respectively responsive to fluid pressure in said first named and other chambers, means in said housing including said one piston means defining other passage means normally connecting said other chamber in pressure fluid communication with said reservoir means, and other means movable in said one piston means for controlling said other passage means and having a free end portion extending into said first named chamber, said other means being movable in response to the established fluid pressure in said first named chamber acting on the free end portion thereof toward a position in said other passage means interrupting pressure fluid communication therethrough, the established fluid pressure in said first named chamber acting on one of the opposed ends of said one piston means to move said one piston means toward a position establishing fluid pressure in said other chamber acting on the other of said opposed ends thereof when pressure fluid communication through said other passage means is interrupted.

2. The tandem master cylinder according to claim 1, comprising a valve seat on said one piston means in circumscribing relation with said other passage means, said other means including third piston means movable in said one piston means and having opposed ends, one end of said third piston means defining said free end portion and the other end thereof defining a valve element for engagement with said valve seat to close said other passage means and interrupt pressure fluid communication between said other chamber and said reservoir means.

3. The tandem master cylinder according to claim 1, including abutment means on said other piston means defining a lost motion connection with said free end portion of said other means, said other piston means being movable in response to the applied force to effect lost motion engagement of said abutment means with said free end portion of said other means to mechanically drive said other means toward its position interrupting pressure fluid communication through said other passage means and to thereafter mechanically drive said other means and said one piston means to establish fluid pressure in said other chamber in the event of fluid pressure failure in said first named chamber.

4. The tandem master cylinder according to claim 3, wherein said other means includes a third piston means movable in said one piston means and having opposed ends, one end of said third piston means defining said free end portion and the other end thereof being normally movable in said other passage means in response to the established fluid pressure in said first named chamber acting on said one end thereof toward a position closing said other passage means and interrupting pressure fluid communication between said other chamber and reservoir means, said third piston means other end also being movable to close said other passage means upon the establishment of the lost motion engagement between said abutment means and said third piston means one end.

5. The tandem master cylinder according to claim 4, wherein said other passage means includes a stepped bore in said one piston means extending through the opposed ends thereof, said third piston means being movable in the larger portion of said stepped bore, and sealing means sealably engaged between said third piston means and one piston means preventing pressure fluid communication between said first named and other chambers through said stepped bore.

6. The tandem master cylinder according to claim 5, including another bore in said housing, said one and other piston means being movable in said housing bore and defining therewith said first named and other chambers, said other passage means also including a peripheral chamber defined in said bore between the opposed ends of said one piston means, a port in said housing normally connecting said reservoir means with said housing bore in pressure fluid communication with said peripheral chamber, and a passage in said one piston means between said peripheral chamber and the larger portion of said stepped bore.

7. The tandem master cylinder according to claim 5, including a valve seat on said one piston means between the larger and smaller portions of said stepped bore, and a valve element on said third piston means other end for engagement with said valve seat to interrupt pressure fluid communication through said other passage means.

8. The tandem master cylinder according to claim 7, including resilient means normally urging said valve element toward a position spaced from said valve seat, and other abutment means on said third piston means for displacement preventing engagement with said one piston means.

No references cited.

MARTIN P. SCHWADRON, *Primary Examiner.*

ROBERT R. BUNEVICH, *Examiner.*